(12) United States Patent
Wang

(10) Patent No.: US 8,726,408 B2
(45) Date of Patent: May 13, 2014

(54) ELECTRONIC DEVICE WITH ENCRYPTION FUNCTION

(75) Inventor: Luna Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 13/454,708

(22) Filed: Apr. 24, 2012

(65) Prior Publication Data

US 2012/0287593 A1    Nov. 15, 2012

(30) Foreign Application Priority Data

May 11, 2011    (CN) .......................... 2011 1 0120867

(51) Int. Cl.
*G06F 21/00* (2013.01)
(52) U.S. Cl.
USPC ............................................................ 726/34
(58) Field of Classification Search
USPC .............................................. 726/34, 35, 36
See application file for complete search history.

(56) References Cited

U.S. PATENT DOCUMENTS

| | | | | |
|---|---|---|---|---|
| 4,365,290 A * | 12/1982 | Nelms et al. | ................... | 713/321 |
| 5,506,990 A * | 4/1996 | Holman, Jr. | ................... | 713/300 |
| 5,542,044 A * | 7/1996 | Pope | ................................. | 726/9 |
| 6,439,006 B1 * | 8/2002 | Tsai | ................................. | 70/28 |
| 6,735,698 B1 * | 5/2004 | Callam | ........................... | 726/35 |
| 2006/0288428 A1 * | 12/2006 | Ng et al. | ........................ | 726/36 |

* cited by examiner

*Primary Examiner* — Michael S McNally
(74) *Attorney, Agent, or Firm* — The Webb Law Firm

(57) ABSTRACT

An electronic device includes a housing, a function module, and a mechanical lock. The mechanical lock includes a lock shell, a plurality of lock wheels, a lock axle, a first conductive component, and a second conductive component. Rotation of the lock wheels to an unlocking state permits movement of the lock axle between two positions, where the first conductive component and the second conductive component are electrically connected or disconnected. When the first conductive component and the second conductive component are electrically connected, the function module is able to electrically connect to a power source so as to obtain electrical power therefrom.

4 Claims, 3 Drawing Sheets

ELECTRONIC DEVICE WITH ENCRYPTION FUNCTION

CROSS-REFERENCE TO RELATED APPLICATION

This application claims priority to Chinese Application No. 201110120867.7, filed on May 11, 2011, the entire disclosure of which is incorporated herein by reference.

BACKGROUND OF THE INVENTION

1. Field of the Invention

The invention relates to an electronic device, and more particularly to an electronic device with encryption function.

2. Description of the Related Art

Due to characteristics of notebook computers, such as lightweight, slim, portability, etc., they have become commonly generally used by people at home and at work. Also, a lot of business or personal confidential data are stored in notebook computers. Therefore, how to perform encryptions on notebook computers has become an important issue in the industry.

However, most current encryption technologies make use of software, such as fingerprint recognition, facial recognition, etc. Regardless of the kind of software encryption, hardware devices must be employed, resulting in higher encryption costs.

SUMMARY OF THE INVENTION

Therefore, an object of the present invention is to provide an electronic device with encryption function that is simple and convenient to use and that effectively decreases encryption costs.

According to the present invention, an electronic device with encryption function comprises:

a housing having a groove;

a function module disposed in the housing; and a mechanical lock disposed in the groove with a portion of the mechanical lock being exposed from the groove.

The mechanical lock includes:

a lock shell;

a plurality of lock wheels rotatably disposed in the lock shell with a portion of each of the lock wheels being accessible externally of the lock shell;

a lock axle disposed in the lock shell and movably extended through the lock wheels;

a first conductive component; and a second conductive component.

The lock axle has a first connecting end. The first conductive component is disposed in the lock shell and is disposed at the first connecting end of the lock axle, and is coupled to one of a power source and the function module. The second conductive component is disposed in the lock shell and is disposed at one end of the lock shell proximate to the first connecting end, and is coupled to the other one of the power source and the function module.

Rotation of the lock wheels to an unlocking state permits movement of the lock axle between a first position, where the first conductive component and the second conductive component are electrically connected, and a second position, where the first conductive component and the second conductive component are electrically disconnected. When the first conductive component and the second conductive component are electrically connected, the function module is able to electrically connect to the power source so as to obtain electrical power therefrom.

Preferably, each of the lock wheels includes a coding rotary disc and a cam. The coding rotary disc is rotatably disposed in the lock shell, has a portion exposed from the groove, and is formed with a disc hole. The cam has a hollow cam body and a limiting portion disposed on the cam body. The limiting portion has a shape corresponding to that of the disc hole in the coding rotary disc. The lock axle is movably extended through the cam body and the coding rotary disc of each of the lock wheels. Rotation of the lock wheels to the unlocking state (i.e., password is correct) permits the limiting portion of each of the lock wheels to extend into the disc hole of the corresponding coding rotary disc, and the lock axle can be moved from the second position to the first position, such that the function module is able to electrically connect to the power source and obtain electrical power therefrom.

Preferably, movement of the lock axle from the second position to the first position is through a resilient component disposed in the lock shell. The lock axle further has a second connecting end disposed opposite to the first connecting end. The resilient component is connected between the second connecting end and one end of the lock shell proximate to the second connecting end. Rotation of the lock wheels to the unlocking state enables the resilient component to release a restoring force for moving the lock axle from the second position to the first position, so as to make electrical connection between the first conductive component and the second conductive component.

Preferably, movement of the lock axle from the first position to the second position is through an operating component connected to the second connecting end of the lock axle. The operating component is exposed from the lock shell via a slot formed in the lock shell, and is operable to move the lock axle from the first position back to the second position when the lock wheels are rotated to the unlocking state.

According to the present invention, employing a mechanical lock for encryption can effectively decrease encryption costs, and is more simple and convenient to use.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

Figure 1:
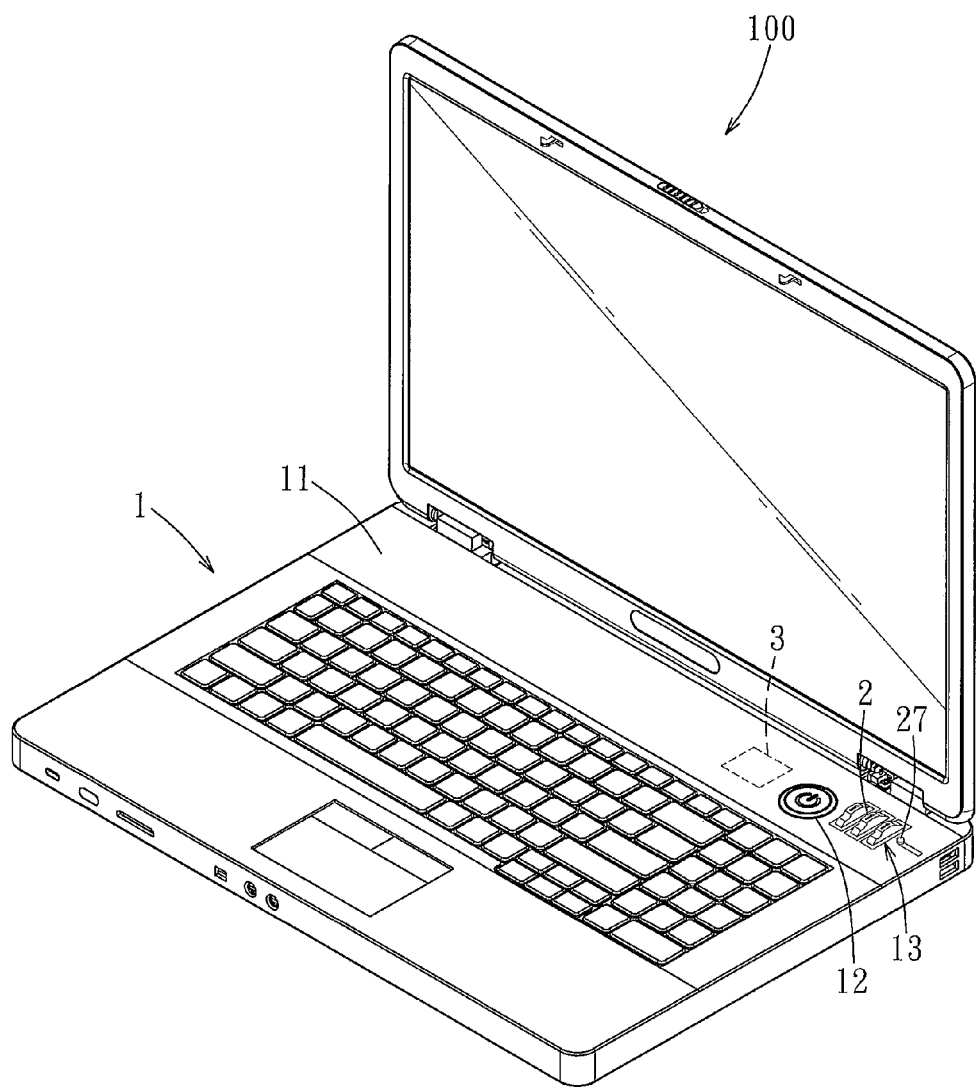
FIG. 1 shows an embodiment of an electronic device with encryption function according to the present invention.

FIG. 1 shows an embodiment of an electronic device with encryption function according to the present invention. In this embodiment, the electronic device 100 is exemplified as a notebook computer. The electronic device 100 includes a housing 1, a mechanical lock 2, and a function module 3.

Power to the function module 3 is controlled through a password setting mechanism of the mechanical lock 2, so as to achieve effects of simple use and lower encryption costs.

Figure 2:
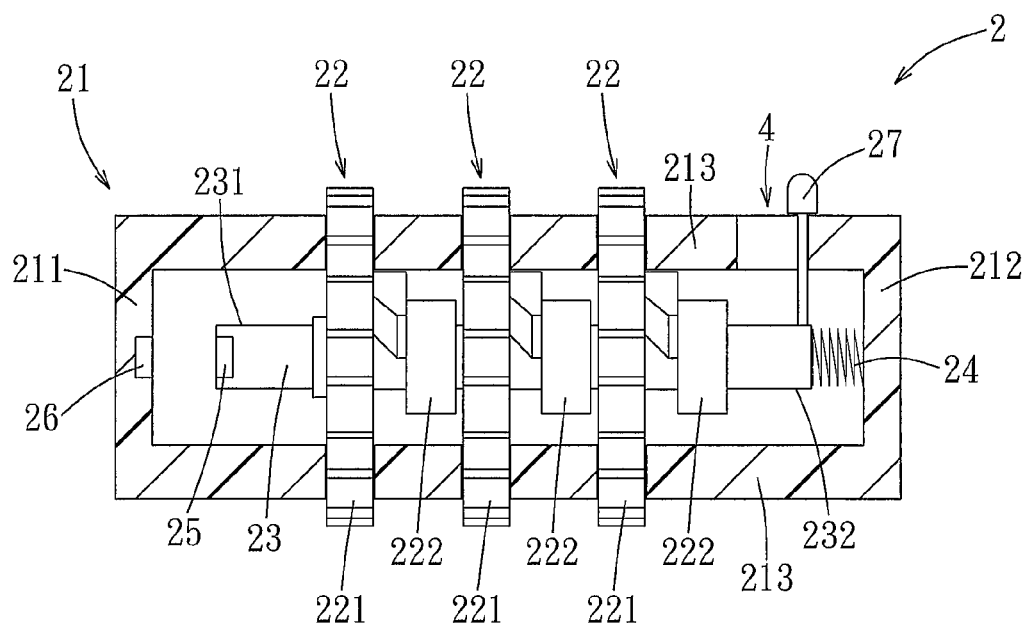
FIG. 2 is a sectional view illustrating a mechanical lock, wherein a lock axle is at a second position.

In this embodiment, the housing 1 includes a housing body 11 and a power control switch 12 disposed on the housing body 11. The housing body 11 is formed with a groove 13 disposed proximate to the power control switch 12. Referring to FIG. 2, the mechanical lock 2 is disposed in the groove 13 and includes a lock shell 21, a plurality of lock wheels 22 rotatably disposed in the lock shell 21 with a portion of each of the lock wheels 22 being accessible externally of the lock shell 21, a lock axle 23 disposed in the lock shell 21 and movably extended through the lock wheels 22, a resilient component 24 disposed in the lock shell 21, a first conductive component 25, and a second conductive component 26. In this embodiment, the number of the lock wheels 22 is three, but should not be limited thereto.

Figure 3:
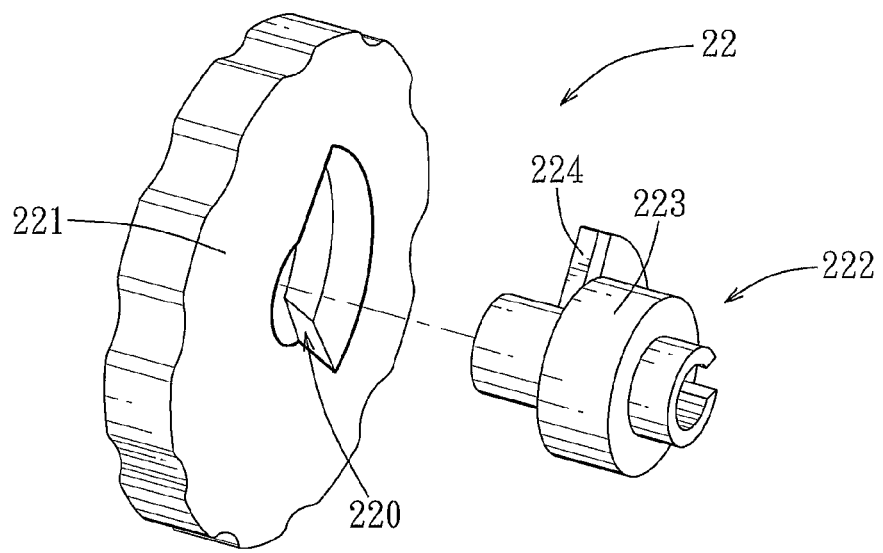
FIG. 3 is an exploded perspective view illustrating a lock wheel.
Figure 4:
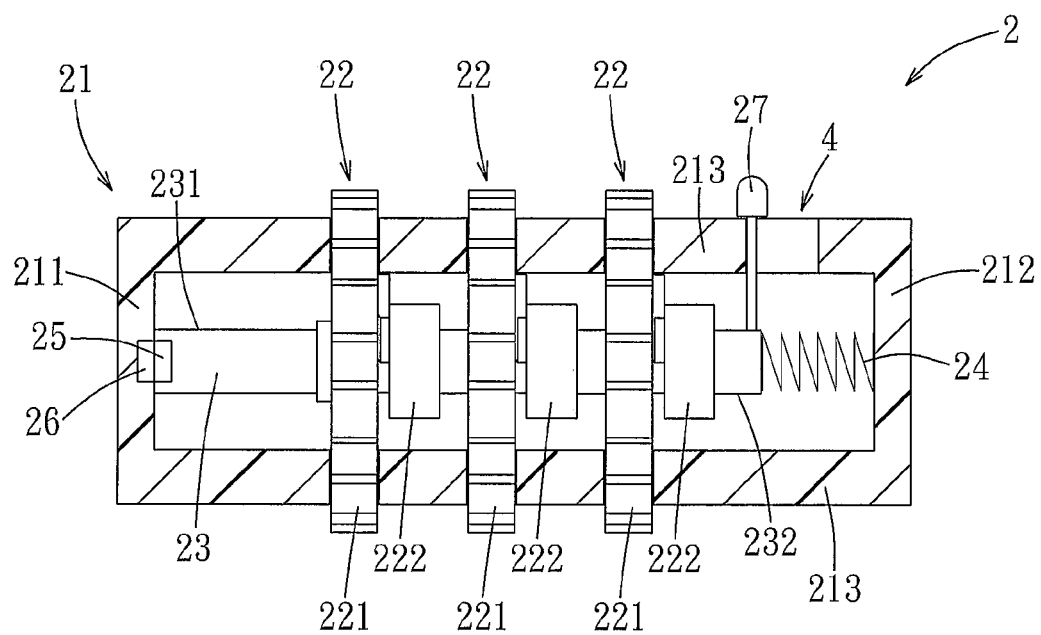
FIG. 4 is a sectional view illustrating the mechanical lock, wherein the lock axle is at a first position.

A longitudinal cross-section of the lock shell 21 is rectangular and has a first short side 211, a second short side 212, and two long sides 213. Referring to FIG. 3, each of the lock wheels 22 includes a coding rotary disc 221 and a cam 222. The coding rotary disc 221 is substantially circular, is disposed in the lock shell 21 in a direction transverse to the length of the lock shell 21, and is formed with a disc hole 220 in about the center of the coding rotary disc 221. Diameter of the coding rotary disc 211 is longer than the first short side 221 and the second short side 212 of the lock shell 21, so that a portion of the coding rotary disc 221 could be exposed from the lock shell 21 for manipulation by users. The cam 222 has a hollow cam body 223 and a limiting portion 224 disposed on the cam body 223. The limiting portion 224 has a shape corresponding to that of the disc hole 220 in the coding rotary disc 221. The lock axle 23 is movably extended through the cam body 223 and the coding rotary disc 221 of each of the lock wheels 22. Rotation of all of the coding rotary discs 221 to an unlocking state (i.e., password is correct) permits the limiting portions 224 of the cams 222 to extend into the disc holes 220 of the corresponding coding rotary discs 221 and makes it possible for movement of the lock axle 23 to a first position, as shown in FIG. 4. Rotation of any one of the coding rotary discs 221 to a locking state (i.e., password is incorrect) results in abutment of the limiting portion 224 of the cam 222 with the corresponding coding rotary disc 221 so that the lock axle 23 could be fixed at a second position, as shown in FIG. 2.

Figure 5:
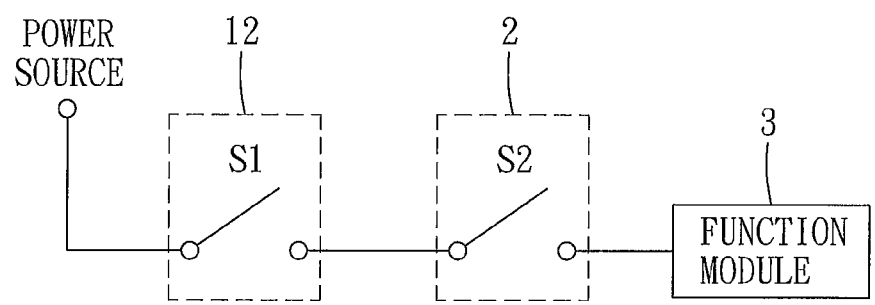
FIG. 5 is a schematic diagram illustrating relationships among a power source, the mechanical lock, and a function module.

Referring to FIG. 2 and FIG. 4, the lock axle 23 has a first connecting end 231 disposed proximate to the first short side 211 of the lock shell 21, and a second connecting end 232 disposed opposite to the first connecting end 231 and proximate to the second short side 212 of the lock shell 21. The resilient component 24 is connected between the second short side 212 of the lock shell 21 and the second connecting end 232 of the lock axle 23 in order to provide a restoring force for moving the lock axle 23 from the second position to the first position. Referring further to FIG. 5, the first conductive component 25 is disposed at the first connecting end 231 of the lock axle 23 and is coupled to the power control switch 12, while the other terminal of the power control switch 12 is coupled to a power source. The second conductive component 26 is disposed on the first short side 211 of the lock shell 21 and is coupled to the function module 3. In this embodiment, the function module 3 is a power managing circuit for converting power of the power source and providing electrical power to other electronic components for operation. When the lock axle 23 is at the second position, the first conductive component 25 and the second conductive component 26 would be separated at a distance so as to be electrically disconnected (that is, a switch S2 in FIG. 5 is in a non-conducting state), resulting in an open circuit between the function module 3 and the power source, so that the function module 3 is unable to obtain electrical power from the power source, thereby causing the entire electronic device 100 to be in a shut-off mode. Rotation of all of the coding rotary discs 221 to a position of correct password (i.e., unlocking state) enables the resilient component 24 to release a restoring force for moving the lock axle 23 to the first position, and make electrical connection between the first conductive component 25 and the second conductive component 26 (that is, the switch S2 in FIG. 5 is in a conducting state), resulting in a closed circuit between the function module 3 and the power source. Furthermore, when the power control switch 12 is triggered to conduct, i.e., the switch S1 in FIG. 5 is in a conducting state, the function module 3 would be able to obtain electrical power from the power source, thereby causing the electronic device 100 to be in a working mode.

Therefore, through password setting of the mechanical lock 2, the lock axle 23 could be moved between positions where the first conductive component 25 and the second conduction component 26 are electrically connected (at the first position) or disconnected (at the second position), resulting in closed circuit or open circuit between the function module 3 and the power source, so as to achieve an encryption effect on the electronic device 100. As long as the password of the mechanical lock 2 is incorrect, the electronic device 100 would be unable to obtain electrical power for normal operation, thus ensuring safety of data in the electronic device 100. Moreover, employing a mechanical lock 2 to achieve encryption function will make it simpler and more convenient to use and effectively decreases encryption costs.

It is noted that positions of the first conductive component 25 and the second conductive component 26 could be interchanged. That is, the first conductive component 25 could be coupled to the function module 3, while the second conductive component 26 could be coupled to the power control switch 12, and should not be limited to this embodiment. In addition, the function module 3 is not limited to a power managing circuit, and could be a storage module for data storage (such as a memory module), a reading device for reading an optical disc, etc.

Moreover, referring to FIG. 2 and FIG. 4, one of the long sides 213 of the lock shell 21 is formed with a slot 4. The mechanical lock 2 further includes an operating component 27 that is connected to the second connecting end 232 of the lock axle 23 and that is exposed from the lock shell 21 via the slot 4. The operating component 27 is operable for users to move the lock axle 23 from the first position back to the second position when the lock wheels 22 are rotated to the unlocking state. At this time, the resilient component 24 would store a restoring force for moving the lock axle 23 from the second position to the first position, and to be released the next time the correct password is inputted.

To sum up, the electronic device with encryption function according to the present invention achieves encryption effects by disposing a mechanical lock between the power control switch and the function module thereof to control connection to the power source of the electronic device through password setting mechanism of the mechanical lock. This makes encryptions on electronic devices more convenient and simpler for users, and effectively decreases encryption costs.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device with encryption function, comprising:
    a housing having a groove;
    a function module disposed in said housing; and
    a mechanical lock disposed in said groove, a portion of said mechanical lock being exposed from said groove, said mechanical lock including:
        a lock shell;
        a plurality of lock wheels rotatably disposed in said lock shell, a portion of each of said lock wheels being accessible externally of said lock shell;
        a lock axle disposed in said lock shell and movably extended through said lock wheels;
        a first conductive component; and
        a second conductive component;
        said lock axle having a first connecting end, said first conductive component being disposed in said lock shell and being disposed at said first connecting end of said lock axle, and being coupled to one of a power source and said function module, said second conductive component being disposed in said lock shell and being disposed at one end of said lock shell proximate to said first connecting end, and being coupled to the other one of the power source and said function module;
    wherein rotation of said lock wheels to an unlocking state permits movement of said lock axle between a first position, where said first conductive component and said second conductive component are electrically connected, and a second position, where said first conductive component and said second conductive component are electrically disconnected, and when said first conductive component and said second conductive component are electrically connected, said function module is able to electrically connect to the power source so as to obtain electrical power therefrom, and
    wherein said lock axle further has a second connecting end disposed opposite to said first connecting end, said mechanical lock further including a resilient component disposed in said lock shell, said resilient component being connected between said second connecting end and one end of said lock shell proximate to said second connecting end, and
    rotation of said lock wheels to the unlocking state enabling said resilient component to release a restoring force for moving said lock axle to make electrical connection between said first conductive component and said second conductive component.

2. The electronic device with encryption function as claimed in claim 1, wherein each of said lock wheels includes a coding rotary disc and a cam,
    said coding rotary disc being rotatably disposed in said lock shell, having a portion exposed from said groove, and being formed with a disc hole,
    said cam having a hollow cam body and a limiting portion disposed on said cam body, said limiting portion having a shape corresponding to that of said disc hole in said coding rotary disc,
    said lock axle being movably extended through said cam body and said coding rotary disc of each of said lock wheels,
    rotation of said lock wheels to the unlocking state permitting said limiting portion of each of said lock wheels to extend into said disc hole of the corresponding coding rotary disc and enabling said resilient component to release the restoring force for moving said lock axle to make electrical connection between said first conductive component and said second conductive component.

3. The electronic device with encryption function as claimed in claim 2, wherein said lock shell is formed with a slot, and said mechanical lock further includes an operating component that is connected to said second connecting end of said lock axle and that is exposed from said lock shell via said slot, said operating component being operable to move said lock axle from the first position back to the second position when said lock wheels are rotated to the unlocking state.

4. The electronic device with encryption function as claimed in claim 3, wherein said housing further includes a power control switch to be coupled between the power source and said mechanical lock, one of said first conductive component and said second conductive component being coupled to the power source via said power control switch.

* * * * *